US008539110B2

(12) United States Patent
Glanzer et al.

(10) Patent No.: US 8,539,110 B2
(45) Date of Patent: Sep. 17, 2013

(54) BLOCK-ORIENTATED CONTROL SYSTEM HAVING WIRELESS GATEWAY FOR COMMUNICATION WITH WIRELESS FIELD DEVICES

(75) Inventors: David A. Glanzer, Austin, TX (US); Marcos Peluso, Chanhassen, MN (US); Berry Mulder, Amsterdam (NL); Alexander Chernoguzov, Fort Washington, PA (US); Koji Demachi, Tokyo (JP); Bill Tatum, Davidson, NC (US)

(73) Assignee: Fieldbus Foundation, Austin, TX (US)

( * ) Notice: Subject to any disclaimer, the term of this patent is extended or adjusted under 35 U.S.C. 154(b) by 1084 days.

(21) Appl. No.: 12/167,981

(22) Filed: Jul. 3, 2008

(65) Prior Publication Data
US 2009/0177289 A1 Jul. 9, 2009

Related U.S. Application Data

(60) Provisional application No. 60/947,885, filed on Jul. 3, 2007.

(51) Int. Cl.
*G06F 15/16* (2006.01)
(52) U.S. Cl.
USPC .............................. 709/249; 709/226; 700/7
(58) Field of Classification Search
USPC .................................... 709/249, 226
See application file for complete search history.

(56) References Cited

U.S. PATENT DOCUMENTS

| | | | |
|---|---|---|---|
| 6,359,729 B1* | 3/2002 | Amoruso | 359/341.1 |
| 6,424,872 B1* | 7/2002 | Glanzer et al. | 700/18 |
| 7,272,457 B2 | 9/2007 | Glanzer et al. | 700/83 |
| 2003/0210387 A1* | 11/2003 | Saunders et al. | 356/73 |
| 2005/0228509 A1 | 10/2005 | James | |
| 2005/0240286 A1* | 10/2005 | Glanzer et al. | 700/18 |
| 2005/0240287 A1* | 10/2005 | Glanzer et al. | 700/18 |
| 2006/0077917 A1 | 4/2006 | Brahmajosyula et al. | |
| 2007/0153677 A1* | 7/2007 | McLaughlin et al. | 370/216 |
| 2008/0148296 A1* | 6/2008 | Chen et al. | 719/328 |
| 2009/0010233 A1* | 1/2009 | Pratt et al. | 370/338 |

FOREIGN PATENT DOCUMENTS

| | | |
|---|---|---|
| GB | 2403043 A | 12/2004 |
| GB | 2427329 A | 12/2006 |

OTHER PUBLICATIONS

International Search Report & Written Opinion dated Dec. 29, 2008 for PCT/US2008/069252.
Extended European Search Report dated Apr. 17, 2012 for European Patent Application No. 08 791 100.9, Apr. 17, 2012, 1-8.

* cited by examiner

*Primary Examiner* — Tauqir Hussain
(74) *Attorney, Agent, or Firm* — Dorsey & Whitney LLP

(57) ABSTRACT

An apparatus in a distributed control system having a network interface and wireless gateway coupled to the network interface. The network interface is configured to communicate with a network. The wireless gateway includes a wireless gateway function block application process configured to map process information between a wireless network having at least one wireless field device and the network. The wireless gateway further includes a wireless network management component configured to manage access to the wireless network and at least one wireless field device function block application process configured to define a resource and input and output process information of the wireless field device.

30 Claims, 5 Drawing Sheets

BLOCK-ORIENTATED CONTROL SYSTEM HAVING WIRELESS GATEWAY FOR COMMUNICATION WITH WIRELESS FIELD DEVICES

CROSS-REFERENCE TO RELATED APPLICATIONS

This application claims benefit of U.S. Provisional Patent Application Ser. No. 60/947,885, entitled WIRELESS FIELDBUS NETWORK SYSTEM AND METHOD, filed Jul. 3, 2007, which application is incorporated in its entirety herein by reference.

TECHNICAL FIELD

The present invention relates to control system architecture. More particularly, the present invention relates to an open, interoperable distributed control system in a high performance network environment including wireless field devices.

BACKGROUND OF THE INVENTION

Automatic control systems are critical to all sectors of industry such as process control, discrete control, batch control (process and discrete combined), machine tool control, motion control, and robotics. One of the strongest needs in modern control systems is development and use of "open" and "interoperable" systems. Open, interoperable systems allow control devices made by different manufacturers to communicate and work together in the same system without the need for custom programming. "Fieldbus" is the common term used to describe these types of control systems.

The movement toward open, interoperable fieldbus systems is driven by device manufacturers and end users. Manufacturers want open, interoperable systems because it allows them to sell their products to more end users while reducing development costs. End users want open, interoperable systems so that they can select the best control devices for their system regardless of the device manufacturer.

There has also been a trend toward distribution of control functions into intelligent devices. In centralized control systems, a central controller performs all the control functions.

In distributed control systems, more than one control device operating in the system takes an active role in the control functions. Although both centralized and decentralized systems use a communication network, decentralized systems reduce overall system costs by reducing or eliminating the centralized controller functions between the control devices and the human-machine interface.

In order for distributed control systems to be truly open and interoperable, both the communications system and the user layer (above the communication system layers) must be specified and made open. An example of an open and interoperable distributed system is the fieldbus system provided by the Fieldbus Foundation. The FOUNDATION™ fieldbus user layer is described, e.g., in U.S. Pat. No. 6,424,872 entitled "BLOCK-ORIENTED CONTROL SYSTEM" (the "'872 patent") and U.S. Pat. No. 7,272,457 entitled "FLEXIBLE FUNCTION BLOCKS" (the "'457 patent"), both assigned to assignee of the present application.

The 31.25 kilobits per second fieldbus (H1) and High Speed Ethernet fieldbus (HSE) used by the FOUNDATION™ fieldbus is described in part by International Electrotechnical Committee (IEC) Standard IEC 61158, the entirety of which is hereby incorporated by reference herein.

While the FOUNDATION™ fieldbus provides the open and interoperable solution for the H1 control capability, there is a great need to provide an open and interoperable solution for distributed control on a very high performance communication system typically called a fieldbus "backbone" network. The backbone network aggregates information from the lower speed control devices, e.g., the H1 and other control devices, which is used in supervisory and advanced control applications. The backbone is also needed for integration of control information into the enterprise's Management Information Systems (MIS).

One of the widely accepted standards for high performance communications signaling is Ethernet. Invented by Xerox in the 1970's, Ethernet has progressed from an initial speed of 10 Megabits per second, to 100 Megabits per second, to 1 Gigabit per second and beyond. Ethernet signaling is specified in an Institute of Electrical and Electronics Engineers (IEEE) standard (IEEE 802.3). Ethernet signaling is the underlying technology used by the Internet. The Internet protocols are specified by the Internet Engineering Task Force (IETF) and are issued as Request For Comment (RFC) specifications.

Although Ethernet/Internet technology provides the basic services for a high performance fieldbus backbone, it does not provide for all of the functions needed for use in distributed control systems. In particular, IEEE and IETF do not have suitable open and interoperable solutions for integration of distributed control systems (e.g., the H1 subsystem), system time synchronization, and fault tolerance.

The method of transferring information from lower speed fieldbuses to the Ethernet used by organizations such as Open DeviceNet™ Vendor Association, Inc., ("EtherNet/IP,") and PROFIBUS International, ("PROFINet") are not suitable for use in the high performance environment because they encapsulate the lower speed protocol packets in an Ethernet frame. This method, known as "tunneling," is common in centralized control systems, but is inadequate for high performance distributed control systems. Although simpler to specify, tunneling would require too many Transport Control Protocol (TCP) connections with the resulting interrupt processing and memory overhead on the devices connected to the fieldbus backbone. In addition tunneling wastes much of the Ethernet bandwidth because the lower speed protocol packets (e.g., the H1 packets) are small and in many cases the Ethernet packet overhead would be bigger than a lower speed protocol packet.

Implementing a control system using wireless technology can provide many benefits. For example, utilizing wireless communication can further reduce user installation costs while facilitating connection to points physically or economically difficult to access. Wireless solutions allow easy access to additional measuring and actuation points for process supervision and control, process optimization, plant and personnel safety, and maintenance. Implementing a control system using wireless communication poses some challenges, however. One challenge, for example, is maintaining the openness and interoperability in the wireless environment in order to allow wireless field devices made by different manufacturers to communicate and work together in the same system. In typical applications where a specified communication protocol is utilized, for example, the one provided by the Fieldbus Foundation, the wireless field devices must be operable according to the specification. Another challenge is for the wireless field devices to be compatible with existing wired network connections and wired control devices.

Thus, what is needed is an open, interoperable solution optimized for integration of distributed control systems and other control devices in a high performance fieldbus backbone that includes communication and operability with wireless field devices.

DETAILED DESCRIPTION OF PREFERRED EMBODIMENTS

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

For simplicity and illustrative purposes, the principles of the present invention are described by referring to exemplary embodiments, particularly, with specific exemplary implementations of distributed control system in an Ethernet network. However, one of ordinary skill in the art would readily recognize that the same principles are equally applicable to, and can be implemented in, other implementations and designs using any other high speed networks, and that any such variation would be within such modifications that do not depart from the true spirit and scope of the present invention.

HSE Distributed Control System Overview

Figure 1:
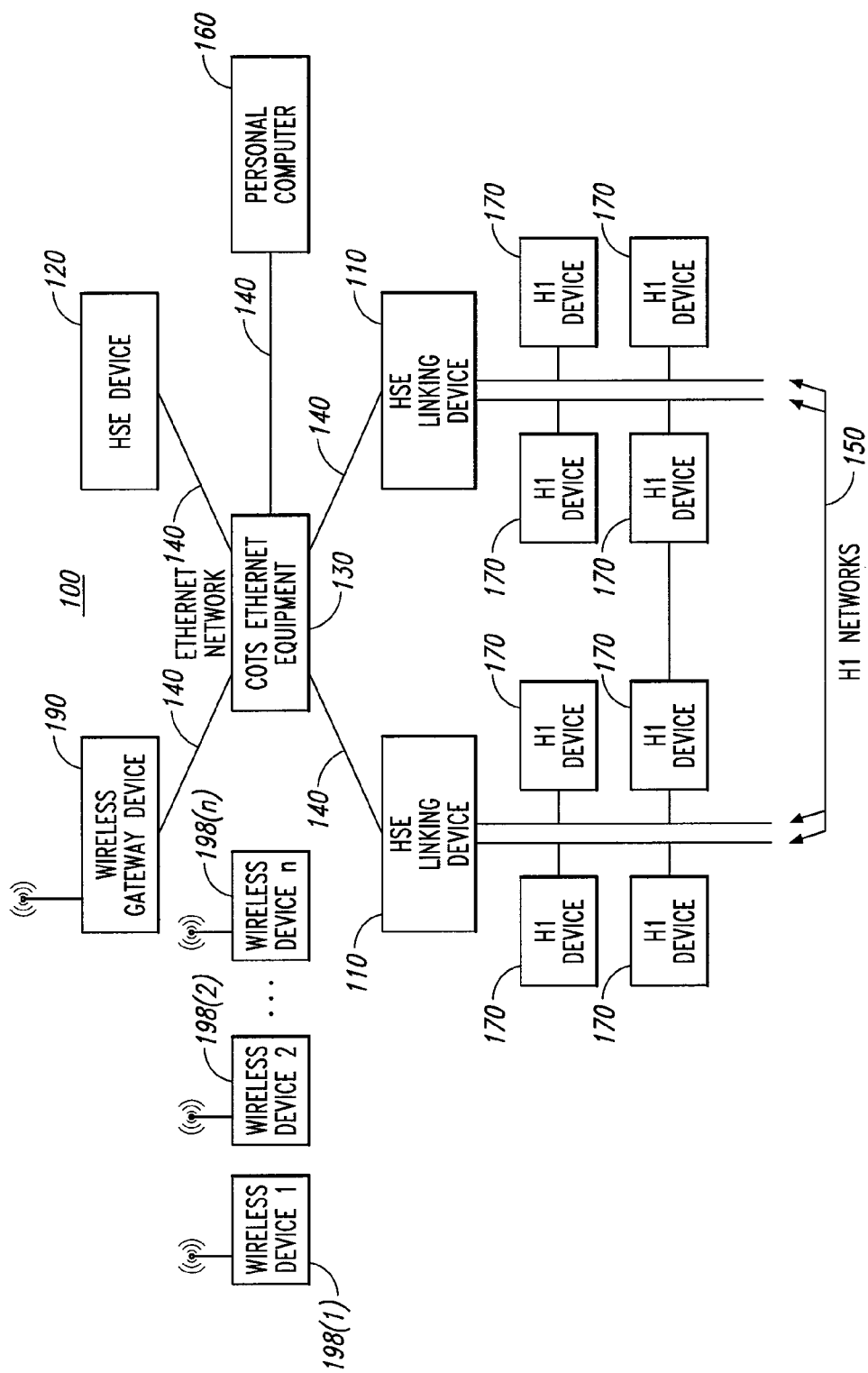
FIG. 1 is a block diagram showing an exemplary embodiment of a high performance distributed control system in accordance with the principles of the present invention.

Referring to FIG. 1, an example of a high performance control system 100 is shown where standard commercial off the shelf (COTS) Ethernet equipment 130 is used to interconnect HSE Linking Devices 110 and HSE Devices 120 to an Ethernet Network 140. The Ethernet Network 140 of FIG. 1 may include both wired network connections and wireless network connections (not shown in FIG. 1). The HSE Linking Devices 110 in turn connect to H1 Devices 170 using H1 Networks 150. Other types of equipment such as a Personal Computer (PC) 160 may also be connected to the Ethernet Network 140.

The actual Ethernet network topology and COTS Ethernet equipment configuration will depend on the particular application needs. However any Ethernet network topology or configuration using standard COTS Ethernet equipment other than the exemplary topology shown in FIG. 1 may be used, and such variations would be within such modifications that do not depart from the true spirit and scope of the present invention.

The control system 100 further includes a wireless gateway device 190 and wireless field devices 198(1)-198($n$). As will be described in more detail below, the wireless gateway device 190 enables communication with the wireless field devices 198(1)-198($n$) by mapping process information communicated between the wireless field devices 198(1)-198($n$) and other components of the control system 100 in accordance with a communication protocol, such as the Fieldbus Foundation standard, and a network protocol, such as Ethernet. Although the wireless gateway device 190 is shown in FIG. 1 as having a single antenna, in other embodiments the wireless gateway device 190 may have multiple antennas. In some embodiments the wireless gateway device 190 itself may be made redundant and the network 140 is redundant as well. In some embodiments, the wireless field devices 198(1)-198($n$) support application clock synchronization. In some embodiments, application clock synchronization in the wireless field devices follows the synchronization classes as described in U.S. Pat. No. 6,826,590, entitled BLOCK-ORIENTED CONTROL SYSTEM ON HIGH SPEED ETHERNET (the "'590 patent"), which is incorporated herein by reference. In some embodiments, the control system 100 is implemented using the open and interoperable distributed fieldbus system provided by the Fieldbus Foundation, a portion of which is described in the previously referenced '872 patent, '457 patent, and 590 patent, which are all incorporated herein by reference in their entirety. For some embodiments, the user layer of the Fieldbus Foundation standard may be used to implement wireless communication in the control system 100. An example of such implementations will be described in more detail below with reference to FIG. 5.

A.1: HSE System Architecture

Figure 2:
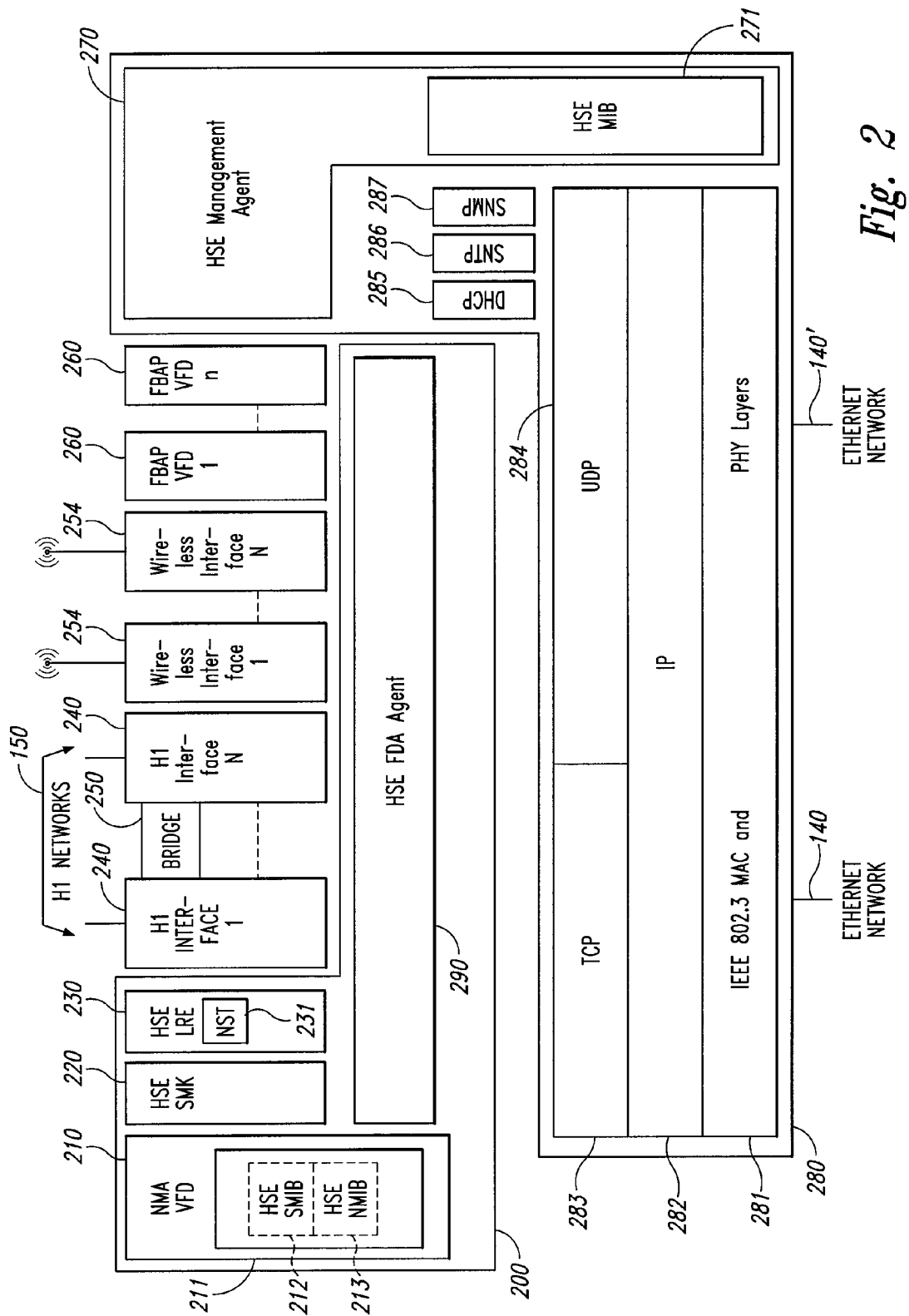
FIG. 2 is a block diagram showing an exemplary embodiment of device system architecture of a high performance distributed control system in accordance with the principles of the present invention.

The HSE system architecture in accordance with an embodiment of the present invention is shown in FIG. 2. The HSE system architecture may be used in high performance distributed manufacturing and process control environments, e.g., in a high speed Ethernet network. It permits distributed automation systems to be constructed from various control and measurement devices manufactured by different vendors. The HSE system architecture is described by architecture components that have been adapted to the specifics of both the H1 and HSE environments.

The various protocols and standards referenced in the following disclosure are described in detail in the manuals and specifications listed in Appendix A herein, which are available from the Fieldbus Foundation, a not-for-profit organization headquartered in Austin, Tex., and the respective current versions as of the filing date of the present invention of all of which are hereby incorporated by reference in their entirety herein. Each of the architecture components of the HSE system architecture (shown in FIG. 2) will now be described in more detail.

Function Block Application Process Virtual Field Device (FBAP VFD)

Application Process (AP) is a term defined by the International Standards Organization (ISO) Open Systems Interconnect (OSI) Reference Model (RM), ISO 7498, to describe the portion of a distributed application that is resident in a single device. The term is used in the following description to refer to the entities within a device that performs a related set of functions, such as function block processing, network management, and system management.

Virtual Field Device (VFD) is a term defined by the Fieldbus Foundation (See Fieldbus Message Specification FF-870 listed in Reference Set 1 in Appendix A herein). A VFD makes the parameters of an AP visible to a communication network.

In accordance with the principles of the present invention, the HSE system architecture (shown in FIG. 2) supports the Function Block Application Process Virtual Field Device (FBAP VFD) 260. The FBAP VFD 260 provides a common means for defining inputs, outputs, algorithms, control variables, and behavior of the automation system. There may be multiple FBAP VFDs 260, e.g., n FBAP VFDs as shown, in a device in order to satisfy the particular needs an application. The FBAP VFD may or may not be present in an HSE Device or HSE Linking Device. If the HSE FBAP VFD is present, the device is sometimes also referred to as a "HSE Field Device." In the following descriptions, however, the FBAP VFD is to be assumed to be present in the HSE Device and HSE Linking Device, even if the term "HSE Field Device" is not used.

A standard set of function block classes and parameters are defined by the Fieldbus Foundation, e.g., in one or more of the specifications listed in Appendix A herein. Manufacturers of control devices may append their own parameters to the standard set of parameters to accommodate additional function block definitions as new requirements are discovered, and as technology advances. A more detailed description of the function block classes and parameters may be found, e.g., in Function Block Application Process-Part 1 Specification FF-890 listed in Reference Set 1 of Appendix A herein.

H1 Interface

Each H1 Network 150 attached to a HSE Linking Device 110 (shown in FIG. 1) requires a H1 Interface 240. The Bridge 250 is used to convey H1 Network messages directly between other H1 Interfaces 240 within the same HSE Linking Device 110 (shown in FIG. 1). A HSE Linking Device may comprise, e.g., a HSE Device 120 (shown in FIG. 1) that includes at least one H1 Interface 240.

Wireless Device Interface.

Each Wireless Interface 254 is used to interface to a network of wireless devices 198(1)-198(n).

A more detailed description of a H1 Interface may be found in the Fieldbus Message Specification FF-870, Fieldbus Access Sublayer Specification FF-821, Data Link Services and Data Link Protocol Specifications FF-821, 822, and Data Link Protocol Specification for Bridge Operation Addendum FF-806, all of which are listed in the Reference Set 1 of Appendix A herein.

Ethernet/Internet Stack.

The HSE system architecture uses a standard COTS Ethernet/Internet ("stack") 280 for communication with other devices on the Ethernet Network 140. The Ethernet/Internet stack used by HSE consists of Distributed Host Control Protocol (DHCP) 285, Simple Network Time Protocol (SNTP) 286, and Simple Network Management Protocol (SNMP) 287, which in turn use Transport Control Protocol (TCP) 283 and User Data Protocol (UDP) 284 services.

TCP 283 and UDP 284 in turn use the standard Internet Protocol (IP) 282 services, which uses the standard IEEE Ethernet 802.3 Media Access Control (MAC) and Physical (PHY) Layers 281. The PHY layer in 281 connects to one or more Ethernet Networks 140.

The Internet DHCP, SNTP, SNMP, TCP, UDP and IP protocols are specified by the Internet Engineering Task Force (IETF) Request For Comment (RFC) specifications. The IETF RFCs are listed in Appendix B herein, which are hereby incorporated by reference herein in their entireties. An Institute of Electrical and Electronics Engineers (IEEE) standard (IEEE 802.3), the entirety of which is hereby incorporated by reference herein, describe the Ethernet MAC and PHY layers. The specific use of each layer and protocol are detailed in the Ethernet Presence Specification FF-586 listed in Reference Set 2 of Appendix A herein.

By preserving the standard use of the Ethernet/Internet stack, the HSE system architecture ensures interoperability among the different stack manufacturers.

HSE Management Agent

Again referring to FIG. 2, in general, the HSE Management Agent 270 uses DHCP 285 for acquiring an IP address for the device, SNTP 286 for maintaining time synchronization with a time server, and SNMP 287 for managing the TCP, UDP, and IP protocol layers. HSE Management Agent use of DHCP, SNTP and SNMP is routine and complies with standard practices known to those familiar with the Internet protocols, e.g., according to IEEE 802.3.

The HSE Management Agent uses SNMP 287 for managing the Internet layer protocols. Specifically, the HSE Management Agent 270 provides Ethernet Network access to the standard Management Information Base-II (MIB II) as defined by SNMPv2 in RFC 1213 and RFC 1643 (see Appendix B), and as defined also by Ethernet Presence FF-586 listed in Reference Set 2 of Appendix A herein.

Figure 3:
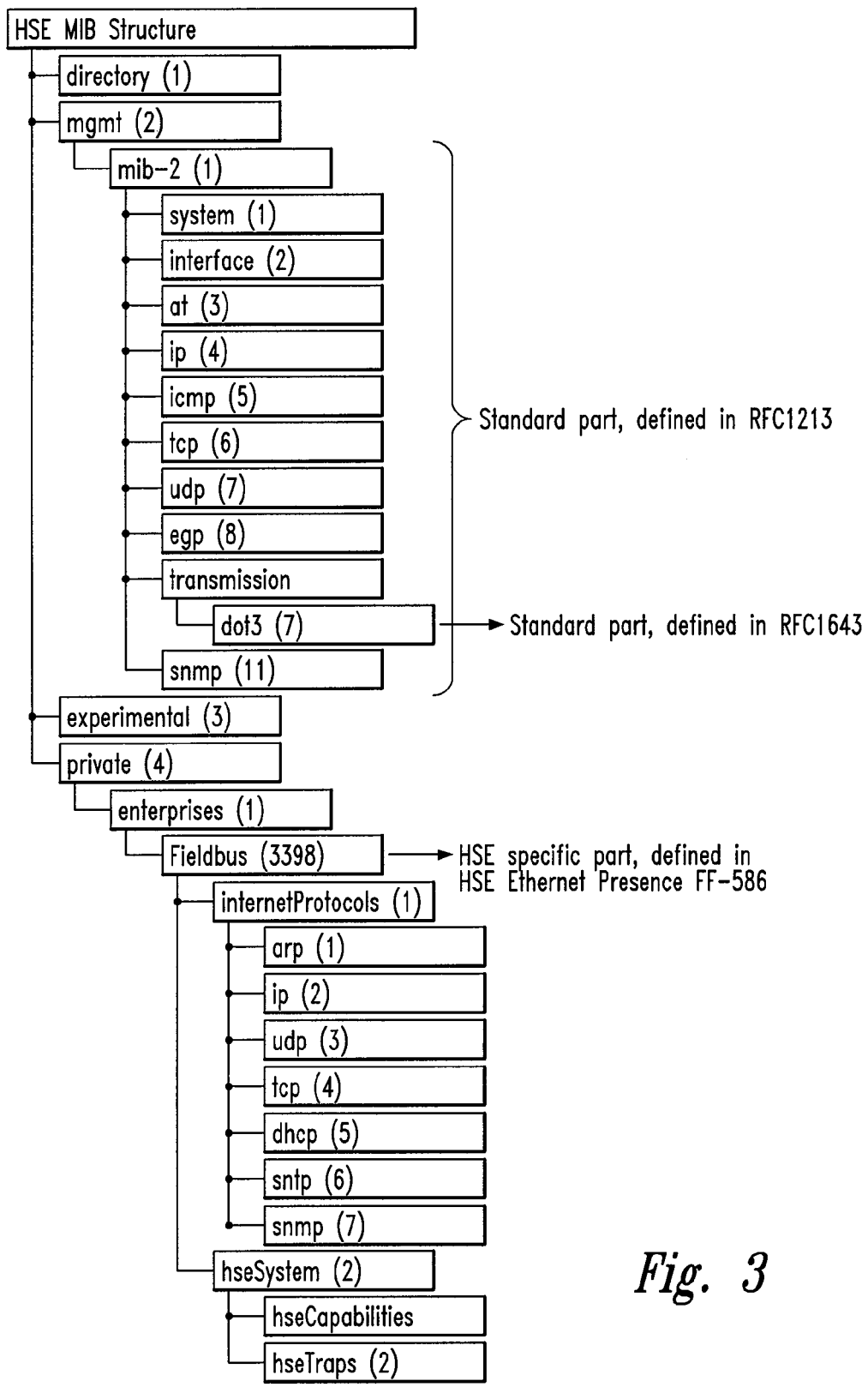
FIG. 3 is a block diagram showing an exemplary embodiment of the structure of the HSE Management Information Base of the device system architecture shown in FIG. 2.

In accordance with an embodiment of the present invention, in order to comply with the ISO standards, the HSE Management Information Base (HSE MIB) 271 comprises of a standard part, which is the second version of MIB-II as defined in RFC 1213 and a HSE specific part (which is defined under the private enterprises level). For convenience in understanding, the detailed structure of the HSE MIB 271 is shown in FIG. 3. The standardized structure of the HSE MIB 271 provides a profile allowing interoperability, making the device appear as a well-behaved node.

B: HSE Core

Referring again to FIG. 2, the HSE core portion 200 of the HSE system architecture identifies the new HSE capability in accordance with the principles of the present invention. The HSE core 200 provides the essential capabilities and integration needed to realize the high performance distributed control using HSE Devices, HSE Linking Devices and standard COTS Ethernet equipment.

B.1: Network Management Agent Virtual Field Device

The HSE System Architecture includes a Network Management Agent VFD (NMA VFD) 210 for each HSE Device and each HSE Linking Device. The NMA VFD provides means for configuring, controlling and monitoring HSE Device and HSE Linking Device operation from the network.

Management information is contained in the Network Management Information Base (NMIB) 213 and the System Management Information Base (SMIB) 212. Using the configuration management capabilities of the NMA VFD, parameters are set in the NMIB and SMIB to support data exchanges with other devices in the system. This process involves defining the transfers between devices and then selecting the desired communications characteristics to support the transfers.

The NMA VFD can also be configured to collect performance and fault related information for selected transfers. This information is accessible during run-time, making it possible to view and analyze the behavior of device communications. If a problem is detected, performance is to be optimized, or device communications are to be changed, then reconfiguration can be performed dynamically while the device is still operating.

NMA VFD parameters and behavior are further defined in the HSE Network Management Specification FF-803 listed in the Reference Set 2 of Appendix A herein.

B.2: HSE Field Device Access Agent

Figure 4:
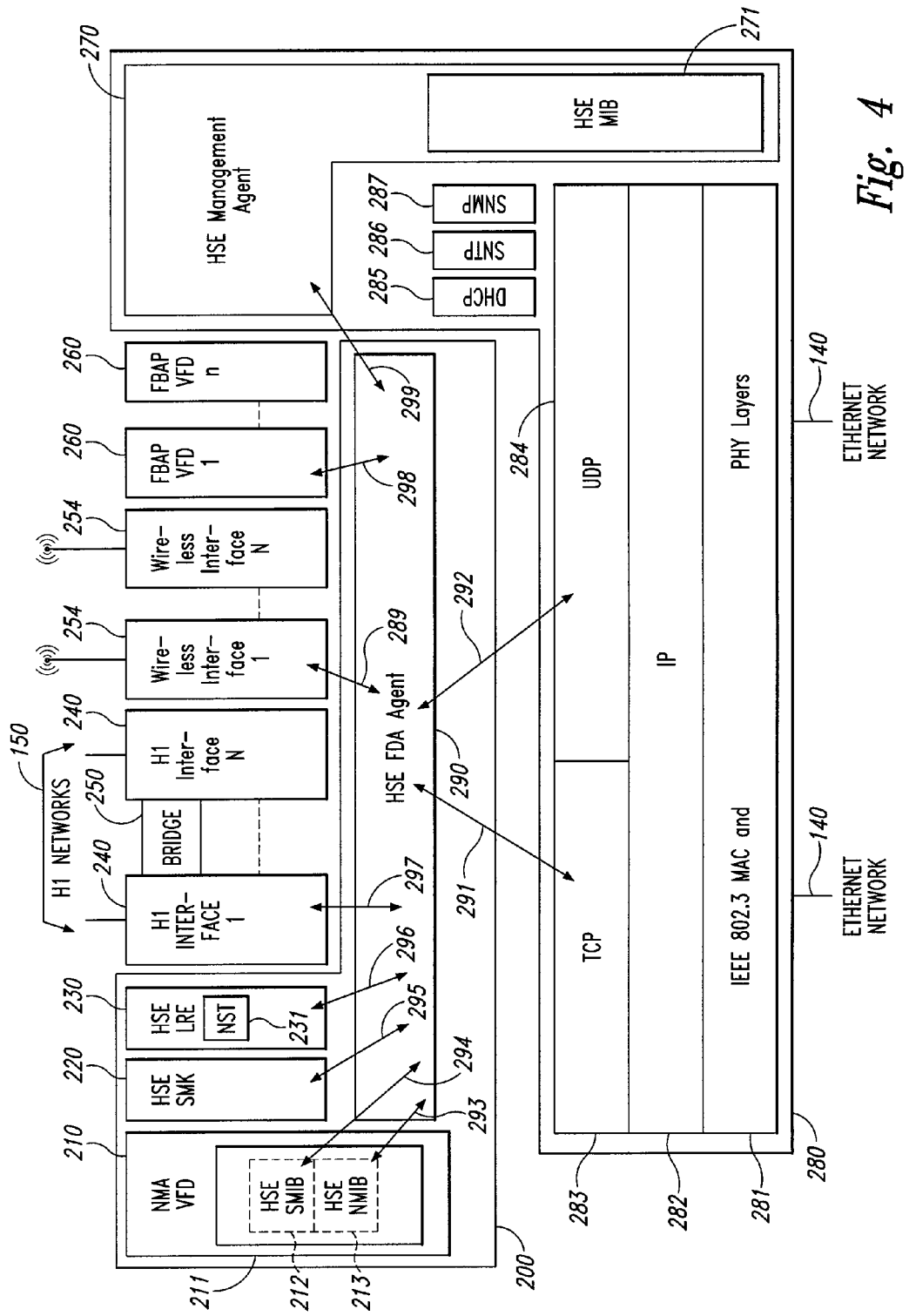
FIG. 4 is a block diagram showing an exemplary embodiment of the device system architecture shown in FIG. 2, showing the various local interfaces of the HSE Field Device Access agent.

The HSE Field Device Access (FDA) Agent will now be described with References to FIG. 4, which is the same figure as FIG. 2 except that Local Interactions (291-299) for the HSE Field Device Access (FDA) Agent 290 are shown. The operation of the HSE FDA Agent will now be described in terms of these local interactions.

One of the functions of the HSE FDA Agent 290 is to map services already defined for FOUNDATION™ fieldbus System Management (SM) (See FF-880 listed in the Reference Set 1 of Appendix A herein) and Fieldbus Message Specification (FMS) (See FF-870 listed in the Reference Set 1 of Appendix A herein) to and from the standard, COTS Ethernet/Internet 280 component.

Generally, the HSE FDA Agent 290 emulates the mapping defined by the FOUNDATION™ fieldbus Fieldbus Access Sublayer specification (See FF-875 listed in the Reference Set 1 of Appendix A herein). The HSE FDA Agent 290 provides the common interface that enables remote applications to access devices of any type on both the H1 Networks 150 and the HSE Network 140.

Thus the HSE FDA Agent 290 in accordance with the principles of the present invention allows systems to be constructed where the control is distributed in into various HSE Devices and/or H1 Devices, and any combinations thereof, as needed by the particular end user application.

B.2.1: HSE FDA Agent Local Interfaces

B.2.1(a): Local Interface 291: TCP—The TCP local interface 291 allows the HSE FDA Agent 290 to send and/or receive FMS messages using TCP 283. TCP 283 provides interfaces modeled as sockets through which the HSE FDA Agent 290 submits a buffer that contains one or more messages.

B.2.1(b): Local Interface 292: UDP—The UDP local interface 292 allows the HSE FDA Agent 290 to send and/or receive SM messages and certain FMS messages using UDP 284. UDP 284 provides interfaces modeled as sockets through which the HSE FDA Agent 290 submits a buffer that contains one or more messages.

B.2.1(c): Local Interface 293: HSE NMIB—The HSE FDA Agent 290 provides a local interface to the HSE NMIB 213 in NMA VFD 210. The HSE FDA Agent is capable of providing configuration and read-only access to NMA VFD 210 via the HSE NMIB Local Interface 293.

B.2.1(d): Local Interface 294: HSE SMIB—The HSE FDA Agent 290 provides a local interface to the HSE SMIB 212 in NMA VFD 210. The HSE FDA Agent 290 is capable of providing configuration and read-only access to NMA VFD 210 via the HSE SMIB Local Interface 294.

B.2.1(e): Local Interface 295: HSE SMK—The HSE FDA Agent 290 conveys HSE SM services to and from the HSE SMK 220 through the HSE SMK local interface 295. In accordance with an embodiment of the present invention, in a HSE Linking Device, the HSE SMK 220 communicates locally with each of the H1 interfaces 240, and does not use the HSE FDA Agent 290.

B.2.1(f): Local Interface 296: HSE LRE—The HSE FDA Agent 290 maintains a local interface with the HSE LAN Redundancy Entity (HSE LRE) 230 of the device through the HSE LRE local interface 296. Use of the HSE LRE local interface 296 will be described in more detail later.

B.2.1(g): Local Interface 297: H1 Interface—Only HSE FDA Agents 290 of a HSE Linking Device interact with the H1 Interface(s) 240 to access H1 Networks 150. The H1 local interface provides the HSE FDA Agent with FMS and SM access through the HSE SMK 220.

Local Interface 289: Wireless Interface—HSE FDA Agents 290 of a Wireless Gateway Device interact with the Wireless Interface 254 to access Wireless Devices 198(1)-198(n). The Wireless Interface provides the HSE FDA Agent with FMS and SM access through the HSE SMK 220.

The HSE FDA Agent forwards FMS requests and responses received from the TCP Interaction 291 and UDP Interaction 292 to H1 Network 150 through the H1 Interface (s) 240, and Wireless Interface 254. The HSE FDA Agent also forwards H1 requests and responses received from a H1 Network through the H1 Interface Interaction 297 to the Ethernet Network 140 using TCP Interaction 291 and UDP Interaction 292.

Thus, the HSE FDA Agent 290 interacts with the services in the H1 Network in the same manner as any other application program would normally interact with the H1 network.

B.2.1(h): Local Interface 298: FBAP VFD—The HSE FDA Agent 290 uses the FBAP VFD local interface 298 to access the FBAP VFD 260. Both FMS and SM messages are communicated using the FBAP VFD local interface 298.

B.2.1(i): Local Interface 299: HSE Management Agent—The HSE FDA Agent 290 maintains the HSE Management Agent local interface 299 with the HSE Management Agent 270 to access certain Quality of Service parameters associated with its UDP/TCP connections. The use of these parameters by the HSE FDA Agent 290 is local to the specific UDP/TCP implementation.

B.2.2: HSE FDA Agent Operation

Again referring to FIG. 4, during the configuration of the system, HSE SMK 220 uses the local interface 295 for adding HSE and/or H1 devices to, and deleting the same from, the distributed system. An exchange of SM messages is used to identify new (or to be deleted) HSE and/or H1 Devices in the system.

For example, after a new HSE Device receives an Internet Protocol (IP) address, the new HSE Device periodically announces its presence on the Ethernet network 140. HSE Linking Devices also announce changes detected on their H1 Network 150. In a similar way, HSE SMK uses the local interface 295 to determine the location of the function block "tags" that might exist in the HSE Devices and/or H1 Devices.

During operation of the system, the data acquisition, display and supervisory control functions, which are typically executing on a Personal Computer (PC) connected to the Ethernet Network 140, will need to access the data in a HSE Device, a HSE Linking Device and/or H1 devices connected to the H1 Networks 150. The data access is typically performed using the "Client/Server" and/or the "Publisher/Subscriber" messages. These data access methods are well known to those familiar with Fieldbus messaging.

For Client/Server and Publisher/Subscriber messages originating or terminating in the HSE Device and/or HSE Linking Device, the HSE FDA Agent 290 sends and receives the Ethernet Network 140 messages on the local interface 291, provides the appropriate mapping to FMS services as previously described above, and uses local interfaces 293, 294, 296, 298, and 299 to access the HSE NMIB 213, HSE SMIB 212, HSE LRE 230, FBAP VFD(s) 260 and the HSE Management Agent 270, respectively. HSE SMK 220 is not accessed because it has its own SM messages as previously described.

For Client/Server, Publisher/Subscriber and/or SM messages originating or terminating in the H1 Network 150, the HSE FDA Agent 290 uses local interface 297 to send and/or receive messages from H1 Interface(s) 240.

If the messages from the H1 network 150 are to/from the Ethernet Network 140, and are Client/Server or Publisher/Subscriber messages, HSE FDA Agent 290 uses the FMS mapping and local interface 291. If the H1 messages to/from the Ethernet Network 140 are SM messages, the HSE FDA Agent uses the SM mapping and local interface 292.

If the messages to/from H1 Network 150 are to/from the HSE Linking Device, and are Client/Server or Publisher/Subscriber messages, HSE FDA Agent will use FMS mapping and the appropriate local interface (except the local interfaces 291 and 292).

If the messages to/from H1 Network 150 are to/from the HSE Linking Device, and are SM messages, HSE FDA Agent will use SM mapping and the appropriate local interface (except the local interfaces 291 and 292).

B.3: HSE System Management Kernel

Referring again to FIG. 2, the HSE system architecture includes a HSE System Management Kernel (SMK) 220 for each HSE device and/or each HSE linking device. The HSE SMK 220 maintains information and a level of coordination that provides an integrated network environment for the execution and interoperation of the FBAP VFD 260.

As previously discussed, HSE SMK 220 provides for routine configuration of certain basic system information prior to device operation. For example HSE SMK startup takes a device through a set of predefined phases for this purpose. During this procedure a system configuration device recognizes the presence of the device on the network and configures basic information into the HSE SMIB 212. Once the device receives its basic configuration information, its HSE SMK brings it to an operational state without affecting the operation of other devices on the network. It also enables the HSE FDA Agent 290 for use by other functions in the device.

Figure 5:
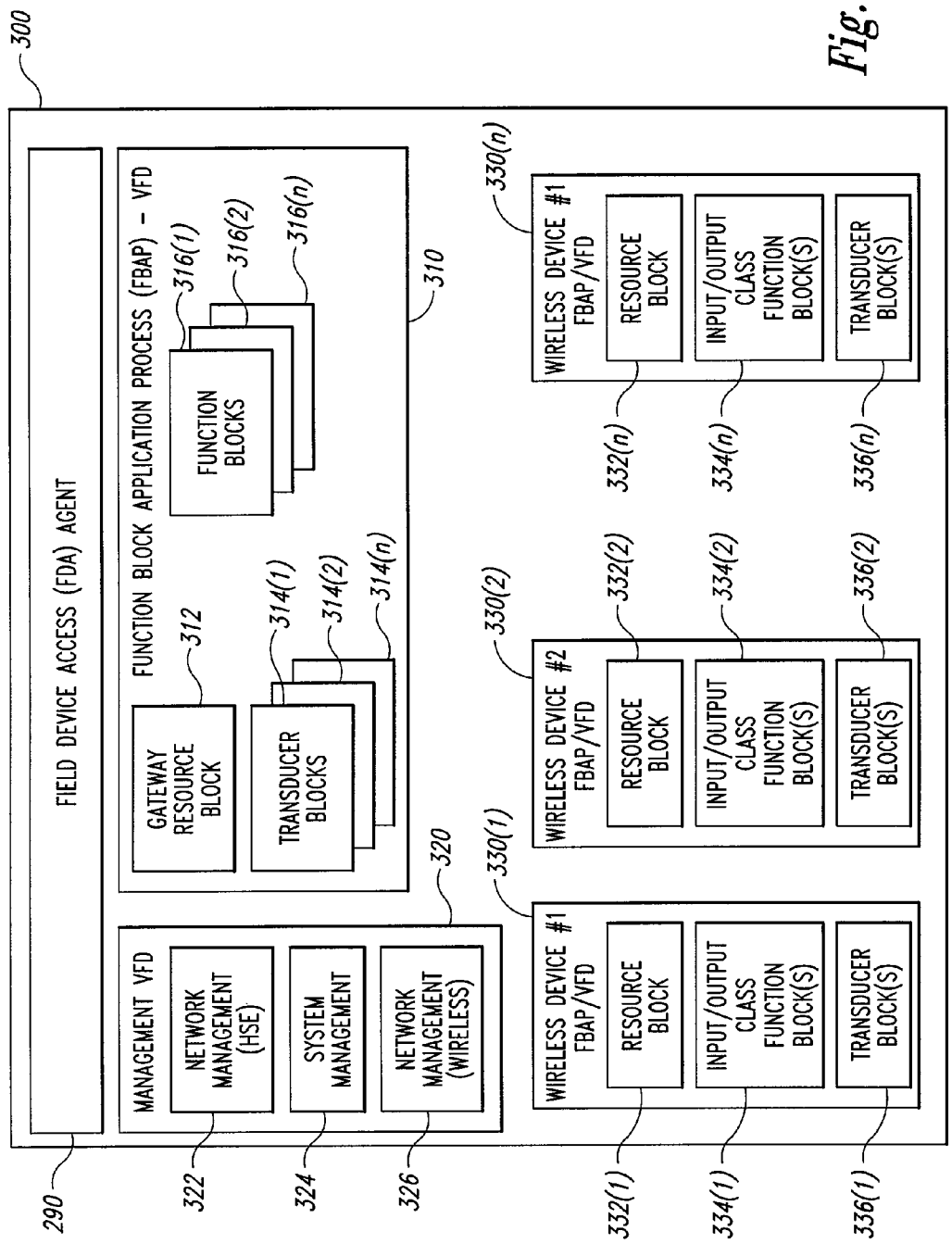
FIG. 5 is a block diagram of a wireless gateway architecture according to an embodiment of the present invention.

FIG. 5 illustrates a wireless gateway architecture 300 according to an embodiment of the present invention. The wireless gateway architecture may be implemented in the wireless gateway device 190 illustrated in FIG. 1. The wireless gateway architecture 300 allows communication of process information between components of the control system 100 and wireless field devices 198(1)-198(n). Example process information includes device identification information, configuration commands, process variables, device status, diagnostic and alarm information, and the like. The wireless gateway architecture provides network management for the gateway as a single node on the network. In some embodiments, network communication with the wireless gateway device 190 can be implemented using the Ethernet protocol previously described, and further described in the '590 patent.

In some embodiments, the wireless gateway device provides access to wireless network management for the wireless network providing access to the wireless field devices that it represents. The wireless gateway architecture 300 may include components previously described with reference to FIG. 2 and the HSE core portion 200.

The wireless gateway architecture 300 may include the FDA Agent 290, which as previously discussed, provides mapping of defined services and messaging to and from the network. The wireless gateway architecture 300 further includes several FBAP-VFDs to support communication with wireless field devices 198(1)-198(n). For example, a FBAP-VFD 310 includes a gateway resource block 312, transducer blocks 314(1)-314(n), and function blocks 316(1)-316(n). The gateway resource block 312 makes the hardware specific characteristics of the wireless gateway device 190 (FIG. 1) accessible to the network. The transducer blocks 314(1)-314(n) can provide a device independent interface used by the function blocks 316(1)-316(n) and can decouple function blocks from local input-output (I/O) functions to prevent overburdening the function blocks with managing receipt and transmission of information. In other embodiments, the transducer blocks 314(1)-314(n) may receive the security parameters for the wireless network security to enable secure communication between components of the control system connected to the network and the wireless field devices 198(1)-198(n). The function blocks 316(1)-316(n) represent the functions performed by the wireless gateway device 190 to provide wireless functionality for the control system 100.

The wireless gateway architecture 300 further includes a Management VFD 320 for managing network communications with the wireless gateway device 190 and the wireless field devices 198(1)-198(n). As will be described in more detail below, management functions for wireless field devices 198(1)-198(n) may also be accommodated by the wireless gateway device 190. In some embodiments, each wireless device that the wireless gateway device 190 supports is represented within the gateway by a FBAP-VFD 310 containing function blocks, transducer blocks, and one resource block.

The Management VFD 320 includes a network management (wired) VFD 322, a network management (wireless) VFD 326, and a system management component 324. The network management (wired) VFD 322 has similar functionality as the NMA-VFD 210 previously discussed with reference to FIG. 2. For example, the network management (wired) VFD 322 provides for configuring, controlling and monitoring operation of devices coupled to the network over a wired connection. The network management (wireless) VFD 326 also has similar functionality as well, but with respect to wireless devices coupled to the network by wireless connection, for example, wireless field devices 198(1)-198(n). The network management (wireless) VFD 326 is shown in FIG. 5 as included with the Management VFD 320, however, in alternative embodiments, the network management (wireless) VFD 326 may be a separate VFD. The system management component 324 maintains information and a level of coordination that provides an integrated network environment for the execution and interoperation of function block applications. In embodiments of the present invention, the wired network may be implemented using currently known, such as Ethernet, or to be developed wired network protocols. Wireless network communication in embodiments of the present invention may be implemented using currently known wireless protocols, for example, IEEE 802.11, or to be developed wireless network protocols.

In some embodiments, the function blocks can reside in the wireless gateway architecture 300 with process information from the wireless field devices being mapped to FBAP/VFDs in the wireless gateway architecture. As shown in FIG. 5, the wireless gateway architecture 300 includes FBAP/VFDs 330(1)-330(n) for the wireless field devices 198(1)-198(n) (FIG. 1). Each of the FBAP/VFDs 330(1)-330(n) may contain function blocks 334, transducer blocks 336, and a resource block 332 per wireless device. The FBAP/VFD 330 are typically included in Wireless Field Devices 198. A resource block 332 provides access to the resources available from the respective wireless field device 198 and can insulate the function block 334 from the physical hardware of the wireless field device 198 by containing a set of implementation independent hardware parameters. The function block 334 represents the basic functions of the wireless field device 198, and in particular, input/output class function blocks receive physical measurements or values from the transducer blocks 336 and may act upon input information and forward the results to the transducer blocks 336. The transducer blocks 336 decouple function block 334 from the local I/O functions required to read sensor hardware and command hardware of the wireless field device 198. In other embodiments, the transducer blocks 336 provide protocol transfer functionality between the network and the wireless field devices 198.

In some embodiments, the Wireless Field Device 198 may not have a corresponding FBAP/VFD 330. In such embodiments a command interface (not shown) associated with FBAP-VFD 310 is used to access and change process information in the Wireless Field Device.

In operation, the wireless gateway architecture 300 maps process information it receives from and to be transmitted to a wireless field device 198(1)-198(n) according to a corresponding FBAP/VFD 330 for the wireless device. Once the function blocks of the wireless gateway architecture 300 that provide mapping of the process information are set up, for example, upon initialization of the control system 100 or connection of a wireless field device to the control system 100, the process information is updated according to the mapping and the remapped process information can be provided to enable communication over the network. The wireless gateway architecture 300 provides transparent communication of the process information between the wireless field devices and other components of the control system.

APPENDIX A

| Number | Revision | Specification |
|---|---|---|
| | | A.1 Reference Set 1 |
| FF-801 | FS 1.4 | Network Management |
| FF-806 | FS 1.0 | Data Link Protocol - Bridge Operation Addendum |
| FF-821 | FS 1.4 | Data Link Services Subset |
| FF-822 | FS 1.4 | Data Link Protocol Subset |
| FF-870 | FS 1.4 | Fieldbus Message Specification |
| FF-875 | FS 1.4 | Fieldbus Access Sublayer |
| FF-880 | FS 1.4 | System Management |
| FF-890 | FS 1.4 | Function Block Application Process-Part 1 |
| | | A.1 Reference Set 2 |
| FF-803 | FS 1.4 | HSE Network Management |
| FF-586 | FS 1.4 | HSE Ethernet Presence |
| FF-588 | FS 1.0 | HSE Field Device Access Agent |
| FF-589 | FS 1.0 | HSE System Management |
| FF-593 | PS 2.0 | HSE Redundancy |

APPENDIX B

| RFC Number | RFC Title |
|---|---|
| 768 | User Datagram Protocol (UDP) |
| 791 | Internet Protocol (IP) Amended by: IP Subnet Extensions, RFC 950 IP Broadcast Datagrams, RFC 919 IP Broadcast Datagrams with Subnets, RFC 922 |
| 792 | Internet Control Message Protocol (ICMP) |
| 793 | Transport Control Protocol (TCP) |
| 826 | Ethernet Address Resolution Protocol (ARP) |
| 894 | Ethernet Framing of IP Datagrams over Ethernet |
| 1042 | IEEE 802.2 & 3 Framing of IP Datagrams over Ethernet |
| 1112 | Internet Group Management Protocol (IGMP) |
| 1122 | Requirements for Internet Hosts - Communication Layers |
| 1155 | Structure and Identification of Management Information |
| 1157 | Simple Network Management Protocol (SNMP) |
| 1213 | Management Information Base-II (MIB II) |
| 1533 | DHCP Options and BOOTP Vendor Extensions |
| 1541 | Dynamic Host Configuration Protocol (DHCP) |
| 1643 | Definitions of Managed Objects for the Ethernet-like Interface Types |
| 2030 | Simple Network Time Protocol (SNTP) |

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus in a distributed control system, comprising:
    a network interface configured to communicate with a network; and
    a wireless gateway coupled to the network interface, the wireless gateway having:
    a wireless gateway function block application process configured to map process information between a wireless network having a plurality of wireless network field devices and the network;
    a wireless network management component configured to manage access to the wireless network, and
    at least one wireless field device function block application process, comprising:
    a resource block configured to define a resource of the wireless field
    device function block application process;
    a function block configured to define input and output process information of a wireless network field device of the plurality of wireless network field devices; and
    a transducer block configured to command and read hardware components of the wireless field device and provide respective process information to the function block,
    wherein the wireless gateway function block application process is configured to provide application clock synchronization between the network and wireless field devices.

2. The apparatus of claim 1 wherein the transducer block is configured to provide protocol transfer functionality between the network and wireless field devices.

3. The apparatus of claim 1 wherein the wireless gateway further includes a field device access agent configured to map predefined services according to a communication protocol to and from a network protocol.

4. The apparatus of claim 1 wherein the network interface comprises a network interface configured to communicate with a high-speed Ethernet network.

5. The apparatus of claim 1 wherein the network interface comprises a network interface configured to communicate with a wireless network.

6. The apparatus of claim 1 wherein the wireless gateway function block application process comprises a gateway resource block, a transducer block, and function blocks configured to monitor and control the wireless gateway function block application process.

7. The apparatus of claim 6 wherein the wireless gateway function block application process further comprises a transducer block configured to provide security parameters for secure communication between components connected to the network and the wireless field devices.

8. The apparatus of claim 1 wherein the wireless field device function block application process is configured to map at least one of wireless field device identification information, configuration commands, process variables, device status, diagnostic and alarm information between a wireless network having at least one wireless field device and the network.

9. The apparatus of claim 1 wherein the wireless gateway function block application process is configured to manage the wireless gateway as a single node on the network.

10. The apparatus of claim 1 wherein the wireless gateway and the network are redundant.

11. A distributed control system, comprising:
    a network configured to provide a communication medium;

at least one wired field device coupled to the network and configured to provide process information to the network;

at least one wireless field device coupled wirelessly to the network, and configured to transmit process information; and a wireless gateway coupled to the network and in wireless communication with the at least one wireless field device, the wireless gateway configured to map the process information between the at least one wireless field device and the network in accordance with a control system communication protocol using at least one wireless field device function block application process, wherein the at least one wireless field device function block application processes comprises:

a resource block configured to define a resource of the at least one wireless field device function block application process;

a function block configured to define input and output process information of the at least one wireless field device; and a transducer block configured to command and read hardware components of the at least one wireless field device and provide respective process information to the function block, wherein the wireless gateway includes a wireless gateway function block application process configured to provide application clock synchronization between the network and the at least one wireless field device.

12. The distributed control system of claim 11, further comprising:

a host coupled to the network and configured to provide process information to the network, wherein the host comprises a host configured to receive process information in accordance with the control system communication protocol.

13. The distributed control system of claim 11 wherein the wireless gateway comprises:

a wireless network management component configured to manage access to the wireless network.

14. The distributed control system of claim 11 wherein the at least one wireless field device includes the at least one wireless field device function block application process.

15. The distributed control system of claim 11 wherein the transducer block is configured to provide protocol transfer functionality between the network and wireless field devices.

16. The distributed control system of claim 11 wherein the at least one wireless field device function block application process is configured to map at least one of wireless field device identification information, configuration commands, process variables, device status, diagnostic or alarm information between the at least one wireless field device and the network.

17. The distributed control system of claim 11 wherein the wireless gateway function block application process comprises a gateway resource block, a transducer block, and function blocks configured to monitor and control the wireless gateway function block application process.

18. The distributed control system of claim 17 wherein the transducer block is configured to provide security parameters for secure communication between components connected to the network and the at least one wireless field devices.

19. The distributed control system of claim 11 wherein the wireless gateway function block application process is configured to manage the wireless gateway as a single node on the network.

20. The distributed control system of claim 11 wherein the wireless gateway includes a field device access agent configured to map predefined services according to the control system communication protocol to and from a network protocol.

21. The distributed control system of claim 11 wherein the network comprises a high-speed Ethernet network.

22. The distributed control system of claim 11 wherein the network comprises at least one of a wired network and a wireless network.

23. The distributed control system of claim 11 wherein the wireless gateway and the network are redundant.

24. A method for communicating process information from a plurality of wireless field devices in a control system coupled to a network, comprising:

providing application clock synchronization between the network and the plurality of wireless field devices;

configuring a mapping of process information to a communication protocol;

acquiring process information using a wireless field device;

mapping the process information, using a wireless field device function block application process associated with the wireless field device, in accordance with the communication protocol;

updating the process information using a wireless gateway function block application process operating according to the communication protocol; and providing the updated process information to components of the control system connected to the network, wherein the wireless field device function block application process comprises:

a resource block configured to define a resource of the at least one wireless field device function block application process;

a function block configured to define input and output process information of the at least one wireless field device; and a transducer block configured to command and read hardware components of the at least one wireless field device and provide respective process information to the function block.

25. The method of claim 24, further comprising providing protocol transfer functionality between the network and wireless field devices.

26. The method of claim 24 wherein providing the processed process information to components of the control system connected to the network comprises providing the processed process information to components of the control system connected to a high speed Ethernet network.

27. The method of claim 24 wherein providing the processed process information to components of the control system connected to the network comprises providing the processed process information to components of the control system connected to a Ethernet network having at least one of wired network connections and wireless network connections.

28. The method of claim 27, further comprising mapping predefined services according to the communication protocol to and from a protocol for the network.

29. The method of claim 24, further comprising providing security parameters for secure communication between components connected to the network and the plurality of wireless field devices.

30. The method of claim 24 wherein mapping the process information in accordance with the communication protocol comprises mapping at least
one of wireless field device identification information, configuration commands, process variables, device status, diagnostic or alarm information in accordance with the communication protocol.

* * * * *